(12) United States Patent
Ambrus et al.

(10) Patent No.: US 9,778,814 B2
(45) Date of Patent: Oct. 3, 2017

(54) ASSISTED OBJECT PLACEMENT IN A THREE-DIMENSIONAL VISUALIZATION SYSTEM

(71) Applicant: Microsoft Technology Licensing, LLC, Redmond, WA (US)

(72) Inventors: Anthony Ambrus, Seattle, WA (US);
Marcus Ghaly, Kirkland, WA (US);
Adam Poulos, Sammamish, WA (US);
Michael Thomas, Redmond, WA (US);
Jon Paulovich, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 286 days.

(21) Appl. No.: 14/611,005

(22) Filed: Jan. 30, 2015

(65) Prior Publication Data

US 2016/0179336 A1    Jun. 23, 2016

Related U.S. Application Data

(63) Continuation of application No. 14/578,123, filed on Dec. 19, 2014, now abandoned.

(51) Int. Cl.
*G09G 5/00* (2006.01)
*G06F 3/0481* (2013.01)
(Continued)

(52) U.S. Cl.
CPC ....... *G06F 3/04815* (2013.01); *G02B 27/017* (2013.01); *G06F 3/013* (2013.01);
(Continued)

(58) Field of Classification Search
None
See application file for complete search history.

(56) References Cited

U.S. PATENT DOCUMENTS 5,583,977 A    12/1996  Seidl
6,426,745 B1   7/2002  Isaacs et al.
(Continued)

FOREIGN PATENT DOCUMENTS

EP   0421818 B1   11/1996
WO   2009158219 A2   12/2009

OTHER PUBLICATIONS

"International Search Report & Written Opinion Issued in PCT Application No. PCT/US2015/063569", Mailed Date: Jun. 28, 2016, 19 Pages.
(Continued)

*Primary Examiner* — Xiao Wu
*Assistant Examiner* — Mohammad H Akhavannik
(74) *Attorney, Agent, or Firm* — Perkins Coie LLP

(57) ABSTRACT

Disclosed is a method, implemented in a visualization device, to assist a user in placing 3D objects. In certain embodiments the method includes displaying, on a display area of the visualization device, to a user, various virtual 3D objects overlaid on a real-world view of a 3D physical space. The method can further include a holding function, in which a first object, of the various virtual 3D objects, is displayed on the display area so that it appears to move through the 3D physical space in response to input from the user, which may be merely a change in the user's gaze direction. A second object is then identified as a target object for a snap function, based on the detected gaze of the user, the snap function being an operation that causes the first object to move to a location on a surface of the target object.

16 Claims, 16 Drawing Sheets

(51) Int. Cl.
 *G02B 27/01* (2006.01)
 *G06F 3/01* (2006.01)
 *G06F 3/0484* (2013.01)
 *G09G 3/00* (2006.01)

(52) U.S. Cl.
 CPC ......... *G06F 3/04842* (2013.01); *G09G 3/001* (2013.01); *G02B 2027/0178* (2013.01); *G09G 2340/0464* (2013.01); *G09G 2354/00* (2013.01)

(56) References Cited

U.S. PATENT DOCUMENTS

| | | |
|---|---|---|
| 6,448,964 B1 | 9/2002 | Isaacs et al. |
| 6,573,903 B2 | 6/2003 | Gantt |
| 7,545,392 B2 | 6/2009 | Sprang et al. |
| 7,561,143 B1 | 7/2009 | Milekic |
| 8,223,145 B2 | 7/2012 | Chakraborty |
| 8,670,957 B2 | 3/2014 | Dayde et al. |
| 2008/0301547 A1 | 12/2008 | Karunakaran et al. |
| 2011/0043517 A1 | 2/2011 | Schneider et al. |
| 2011/0102424 A1 | 5/2011 | Hibbert et al. |
| 2011/0141011 A1 | 6/2011 | Lashina et al. |
| 2014/0333666 A1 | 11/2014 | Poulos et al. |

OTHER PUBLICATIONS

"Second Written Opinion Issued in PCT Application No. PCT/US2015/063569", Mailed Date: Sep. 22, 2016, 7 Pages.

Baudisch, et al., "Snap-and-go: Helping Users Align Objects without the Modality of Traditional Snapping", in Proceedings of the SIGCHI Conference on Human Factors in Computing Systems, Apr. 2, 2005, 10 pages.

"International Preliminary Report on Patentability Issued in PCT Application No. PCT/US2015/063569", Mailed Date: Mar. 16, 2017, 8 Pages.

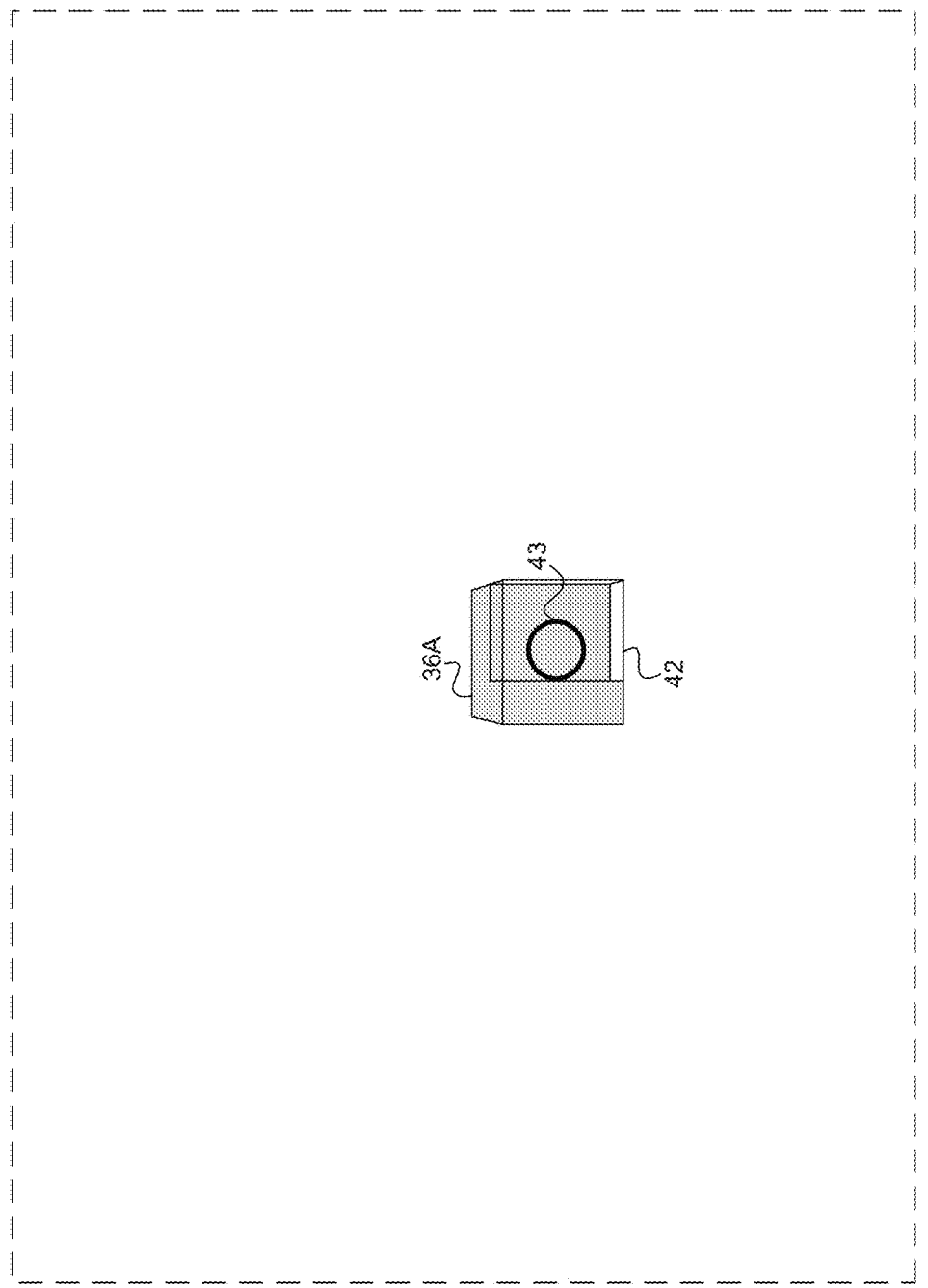

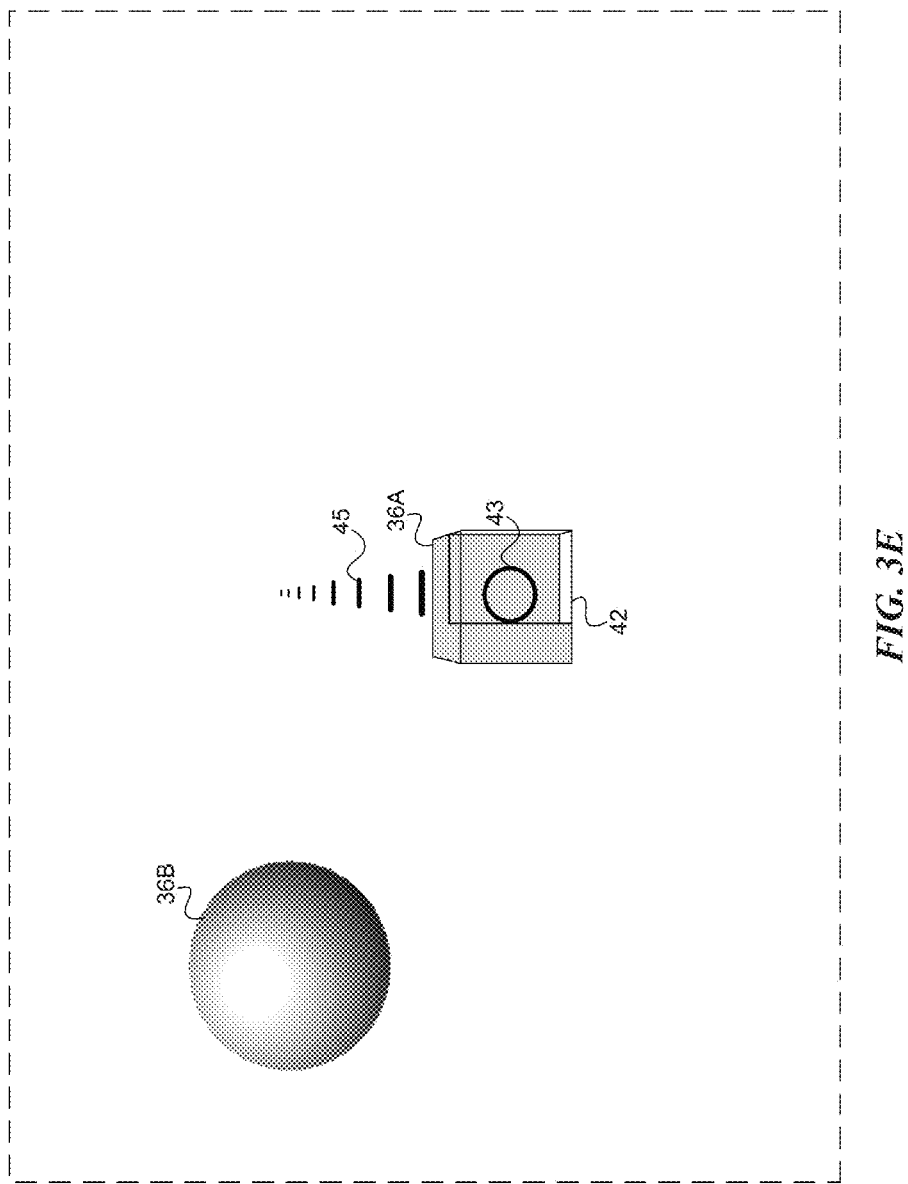

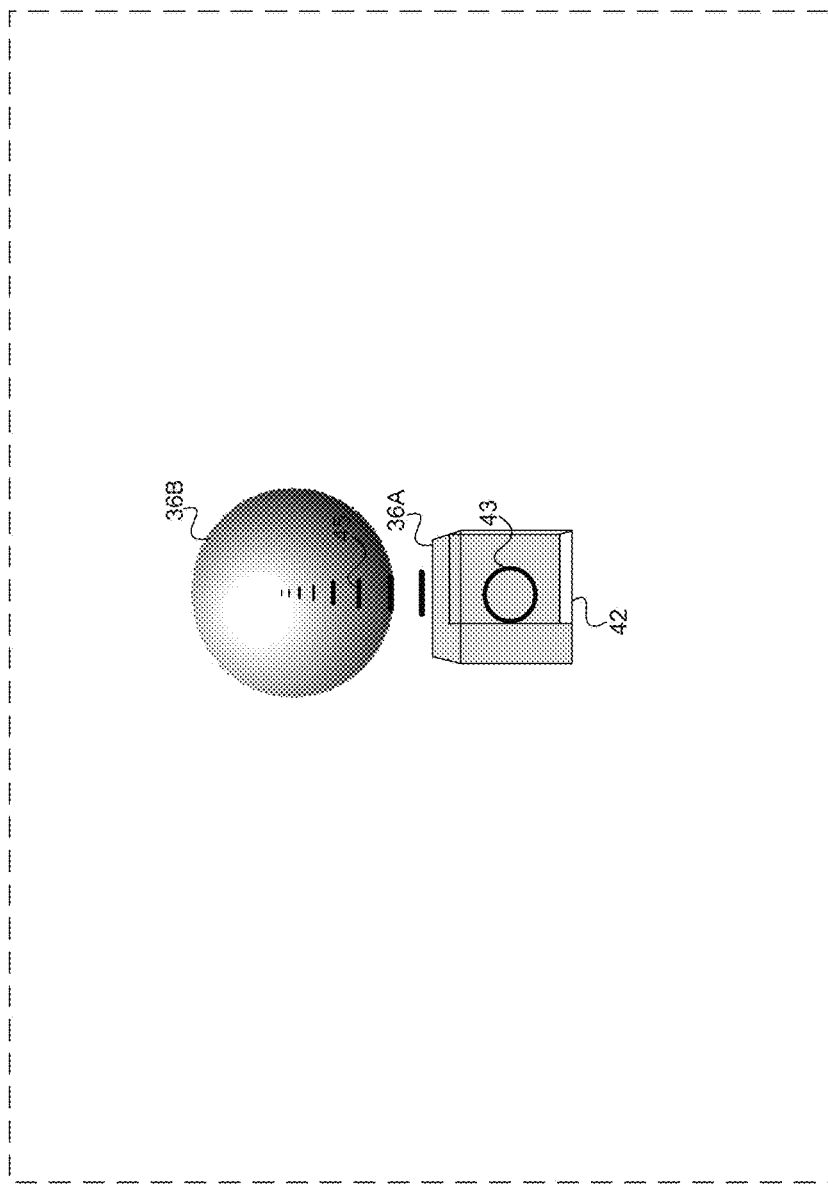

though not necessarily in an immersive AR/VR environment. The tool may be implemented as
ASSISTED OBJECT PLACEMENT IN A THREE-DIMENSIONAL VISUALIZATION SYSTEM This is a continuation of U.S. patent application Ser. No. 14/578,123, filed on Dec. 19, 2014, which is incorporated herein by reference in its entirety.

FIELD OF THE INVENTION

At least one embodiment of the present invention pertains to three-dimensional (3D) visualization systems, and more particularly, to a technique for assisting a user in placing objects in a 3D visualization system.

BACKGROUND

A number of drawing software applications are available today for personal computers and other processing devices, such as smartphones, tablets, etc. Some of those applications include tools or functions to assist a user in placing objects, such as so-called "snap" and "glue" functions. With a snap function, when a user moves a first displayed object to a location very close to a second displayed object, the software further moves the first object automatically so that it is in contact with the second object. This function relieves the user of the tedium of having to precisely position the two objects. A glue function causes two objects to stick together and allows them to be moved together once they are in contact with each other. These functions generally can be enabled or disabled by setting user preferences.

SUMMARY

The technique introduced here provides an object placement tool to assist a user with movement and placement of displayed holographic objects in a 3D visualization environment, particularly though not necessarily in an immersive AR/VR environment. The tool may be implemented as a "virtual magnet" and, therefore, is at times referred to herein as "the magnet tool" or simply as "the magnet." The tool assists the user in picking up a source object (e.g., with a virtual magnet) and then placing the source object precisely on a target object. The tool helps the user to understand in advance exactly how the source object will be oriented once it is picked up, and to understand in advance exactly where the source object will be placed and how it will be oriented on the target object before the user commits to that action.

In certain embodiments the technique introduced here includes a method implemented in a visualization device, which may be an AR/VR visualization device, such as a wearable (e.g., head-mounted) visualization device. The device may be equipped to track the gaze direction of the user, to recognize hand gestures of the user and/or to recognize speech of the user, and to use any of these types of input in operation of the tool.

In certain embodiments the method includes displaying, on a display area of the visualization device, to a user of the visualization device, various virtual 3D objects overlaid on a real-world view of a 3D physical space. The method can further include a holding function, in which a first object (source object), of the various virtual 3D objects, is displayed on the display area so that the first object appears to move through the 3D physical space in response to input from the user. The input in certain embodiments or instances is nothing more than a change in gaze direction of the user.

The method can further include identifying a second object, of the various virtual 3D objects, as a target object for a snap function, based on the detected gaze of the user. The snap function is an operation that causes the first object to move to a location on a surface of the target object.

In some embodiments, the target object of the snap function is identified based also on: a similarity in size between the first object and a candidate target object; a similarity in overall shape between the first object and a candidate target object; or a similarity in shape between a surface of the first object and a surface of a candidate target object; or any combination of such inputs. The method can detect that the user wants to trigger the snap operation, based on, for example: a hand gesture of the user, a spoken command, a gaze of the user or an utterance of the user, or any combination of such inputs.

Before the user grabs the first object with the tool, the method can identify the first object as a candidate object for the holding function (i.e., an object possibly to be grabbed), based on the detected gaze of the user, and in some embodiments or instances, based solely on the detected gaze of the user. The method can display an indication that the first object has been identified as a candidate for the holding operation, such as by displaying a transparent or semi-transparent wireframe bounding box around the first object. To help the user visualize how the object will be oriented if/when it is picked up, the method may further display a cursor on a surface of the bounding box, at a location based on the detected gaze vector of the user. The location of the cursor can be the potential pick-up (grabbing) point for the holding function. The cursor can move across any of the surfaces of the bounding box, in response to changes in the user's gaze vector. When the user triggers the holding function to grab the first object (e.g., by a voice command or hand gesture), the first object is then reoriented, according to the position of the cursor on the bounding volume at the moment the user triggered the holding function.

The method can further include, in response to identifying the target object, causing the first object to appear to slide along a surface of the target object, or across two or more adjacent (non-parallel) surfaces of the target object, in response to a change in gaze direction of the user.

Other aspects of the technique will be apparent from the accompanying figures and detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present invention are illustrated by way of example and not limitation in the figures of the accompanying drawings, in which like references indicate similar elements.

FIGS. 3A through 3K show various examples of a user's view through an AR/VR headset.

DETAILED DESCRIPTION

Figure 1:
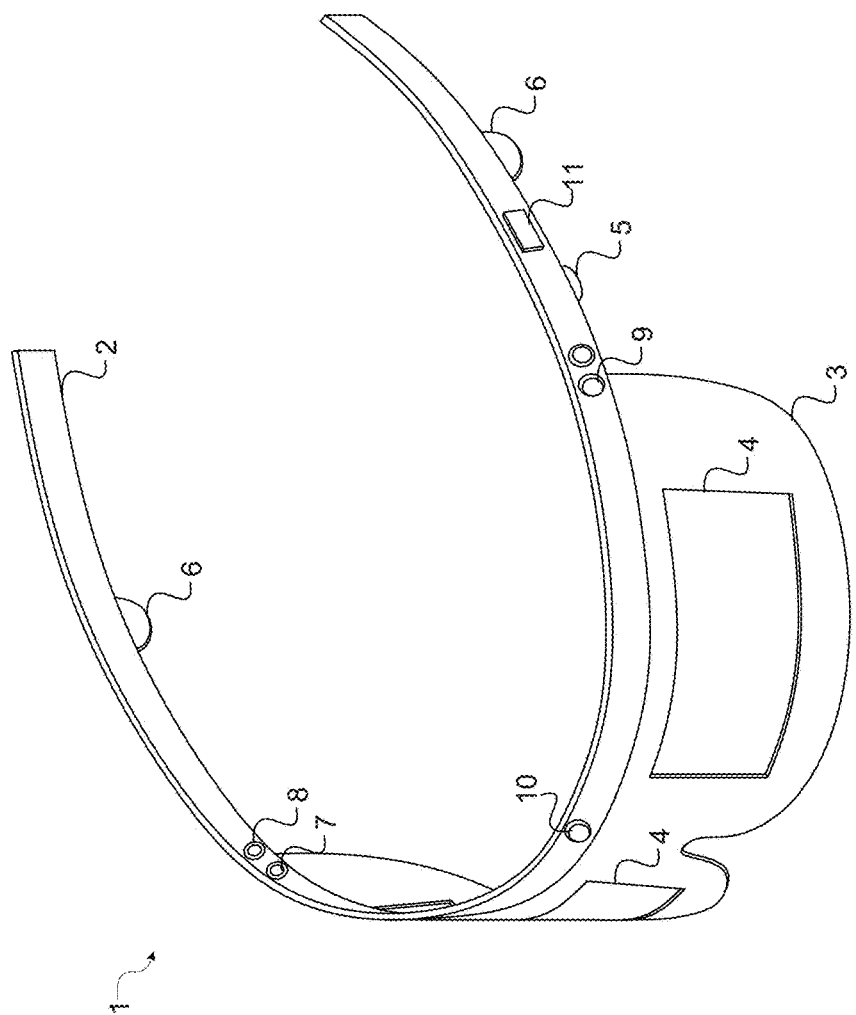
FIG. 1 illustrates an example of an AR/VR headset.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

I. Overview

Free placement of objects displayed in a 3D visualization environment can be very useful for roughly putting 3D objects together, however, it is subject to a tradeoff between placement precision and speed. In a 3D visualization environment, software-assisted object placement is much more complex than in a 2D environment. Among other reasons, visualizing an object's location in depth is difficult. As one example, there is a well-known optical illusion effect when standing still where a small object up close can look just like a large object far away. It is desirable, therefore, to have a tool that assists a user in object placement in 3D, but determining a user's intent becomes increasingly difficult as the complexity of the scene increases. Introduced here, therefore, is an object placement tool that provides precise and quick placement, while being both stable and predictable.

In certain embodiments the tool functions like a virtual/holographic magnet and, therefore, it is interchangeably called the "magnet tool," "the magnet," "the object placement tool," "the placement tool," or "the tool" in various places in this description. The tool may be implemented in a wearable AR/VR headset, for example, as is henceforth assumed herein merely to facilitate description. Note, however, that the techniques introduced here can also be applied in other types of visualization devices and contexts, including standard LCD displays in conventional personal computers, tablets, smartphones, and the like, or any other device that allows a user to move and position objects in 3D on a display.

In certain embodiments, operation of the tool has four phases: 1) selecting and picking up a source object; 2) moving the source object (also called "held object") through space while locating and choosing a target object; and 3) placing and orienting the source object on the target object (called "snapping" to the target object); and 4) releasing the source object at a desired location on the target object to cause the source object to be glued to that position on the target object.

II. Details of Tool Operation

A. Selection of Source Object

In some embodiments, the user can activate the tool by a voice command, such as "magnet," or by using a hand gesture to select a particular icon from a displayed set of icons (e.g., a magnet icon in virtual toolbox). Once activated, the cursor may be replaced or supplemented with a magnet image (e.g., a magnet-shaped surface mesh). If the user is already (virtually) "holding" a holographic object when the tool is activated, then saying "magnet" or making the hand gesture can cause the already held object to be selected as the source object, and the user can then proceed straight to selection of the target object, which is discussed below.

To determine which object should be picked up (the source object), in certain embodiments the process that implements the tool performs a two-step raycast. Each raycast involves continuously casting a (virtual) ray outward from the user along the user's gaze vector (as detected by eye-tracking equipment in the visualization system). The user's gaze vector can be defined as the user's present view direction. The first raycast is used to determine which object to identify as the best candidate source object. Based on that determination, the process then performs a second raycast against a bounding volume that entirely encompasses the object, such as a bounding box. This second raycast is used to position and orient a cursor so that it sits on a face of the bounding volume of the candidate object, giving the user a preview indication of how the object will be oriented once the object is picked up (selected as the source object). These raycasts are updated continuously to reflect changes in the user's gaze vector, until the user picks up an object, making it the source object (held object). The user can pick an object up by, for example, performing a tap gesture with a finger or by speaking a predetermined command, such as "pick up."

B. Selection of Target Object

Once the user picks up an object with the tool, the object appears to stick to the magnet image (if a magnet image is displayed, which is not necessarily the case), and both the source object (held object) and magnet image are moved and oriented so as to be approximately in line with the user's gaze vector, facing out into the scene, at a comfortable viewing distance away from the user (it is desirable not to make the user converge his or her eyes to view it), but without being so far away that the source object is bumping into other objects in the world. About 1 m apparent distance in front of the user may be suitable, for example. The source object, cursor and (if displayed) magnet image may be positioned slightly below the user's gaze vector, however, to keep them from obscuring the rest of the scene, including potential target objects. The source object and magnet image are kept aligned (at least horizontally) with the user's gaze vector as the user's gaze changes.

In certain embodiments, a ray is continuously cast from the cursor into the scene to show the user which object is currently selected as the target object, based on the user's current gaze vector, for example by highlighting whichever object the ray hits (possibly subject to certain selection criteria, as discussed below). This raycast can be aimed at the exact shape of a visible target object to facilitate more accurate selection than if a simpler bounding box outline shape were used. For example, in some embodiments, the raycast causes only the object that the ray actually hits to be highlighted, ignoring any glued behavior (i.e., where two or more objects are glued together).

In some embodiments, AR objects smaller than a certain apparent size relative to the user's view (e.g., 2 cm largest dimension at 1 m apparent distance from the user) are not allowed to be a target object for the tool, but can be picked up as the source object. For example, a holographic rivet could be picked up and placed on a holographic rocket, but the tool would not target other rivets on the rocket. Objects in the scene not being targeted can be made at least partially transparent (e.g., shown in wireframe format) so that the target object is more clear, while retaining the context of the surrounding objects. A depth "pre-pass" may be applied in the rendering process to display only the front surface of transparent or partially transparent objects.

In certain embodiments, once the target object is selected, the source object is made to "stick" to the target object but can move around on the surface of the target object. This can be done by moving the target object to a separate physics "layer," and raycasting against only that layer. The idea here is that any physics calculations (e.g., raycasts) in this situation ignore other objects when the relative orientation of source and target objects is being modified.

C. Snapping to Target Object

The preferred placement point for the source object (i.e., the "snap location") on the target object can be determined by a sphere casting operation. For example, the placement point can be determined as the contact point from the smallest sphere cast along the ray cast from the cursor that still grazes the target object. To achieve this, the tool process can perform a binary search of the sphere radius, starting with a raycast (sphere of zero radius), and a sphere of the minimum radius guaranteed to hit the target object. If the initial raycast hits the target object, the placement process can end there; otherwise, the process proceeds down the binary search to a set depth, looking for the smallest sphere that still hits the target object. This sphere-casting approach can be particularly useful for interacting with the surface reconstruction (SR) mesh and objects that have complex structures and topology. The SR mesh is a collection of 3D points in space that represent the outline of real world edges and surfaces. The effect of this search is to allow the user to still slide the held piece around on the target, even if the user's view does not directly intersect the target mesh.

Once the source object is suitably placed on the target object, the user can enter a predetermined input to release the source object, such as by performing the tap gesture again or by speaking a command (e.g., "release"). This action causes the source object to become glued to the target object at the selected placement location and orientation. Additionally, it causes the other objects in the scene (which may have been made at least partially transparent during target object selection and placement) to be returned to their normal levels of opaqueness (typically fully opaque), moves the target object back to the standard physics layer, and resets the tool state.

III. Example of Visualization System

The technology introduced here includes, in at least one embodiment, a wearable visualization device that provides a placement tool for assisting a user in placing virtual (e.g., holographic) objects in an AR/VR visualization system. The visualization device can be, for example, a headset, glasses or goggles equipped to provide the user with an AR/VR experience. FIG. 1 shows an example of an AR/VR headset that can provide the tool. Note, however, that the techniques introduced here can be implemented in essentially any type of visualization device that allows a user to place 3D objects on a 3D display. The illustrated headset 1 includes a headband 2 by which the headset 1 can be removably mounted on a user's head. The headset 1 may be held in place simply by the rigidity of the headband 2 and/or by a fastening mechanism not shown in FIG. 1. Attached to the headband 2 are one or more transparent or semitransparent lenses 3, which include one or more transparent or semitransparent AR/VR display devices 4, each of which can overlay images on the user's view of his environment, for one or both eyes. The details of the AR/VR display devices 4 are not germane to the technique introduced here; display devices capable of overlaying machine-generated images on a real-time, real-world view of the user's environment are known in the art, and any known or convenient mechanism with such capability can be used.

The headset 1 further includes a microphone 5 to input speech from the user (e.g., for use in recognizing voice commands); one or more audio speakers 6 to output sound to the user; one or more eye-tracking cameras 7, for use in tracking the user's head position and orientation in real-world space; one or more illumination sources 8 for use by the eye-tracking camera(s) 7; one or more depth cameras 9 for use in detecting and measuring distances to nearby surfaces; one or more outward-aimed visible spectrum cameras 10 for use in capturing standard video of the user's environment and/or in determining the user's location in the environment; and circuitry 11 to control at least some of the aforementioned elements and perform associated data processing functions. The circuitry 11 may include, for example, one or more processors and one or more memories. Note that in other embodiments the aforementioned components may be located in different locations on the headset 1. Additionally, some embodiments may omit some of the aforementioned components and/or may include additional components not mentioned above.

Figure 2:
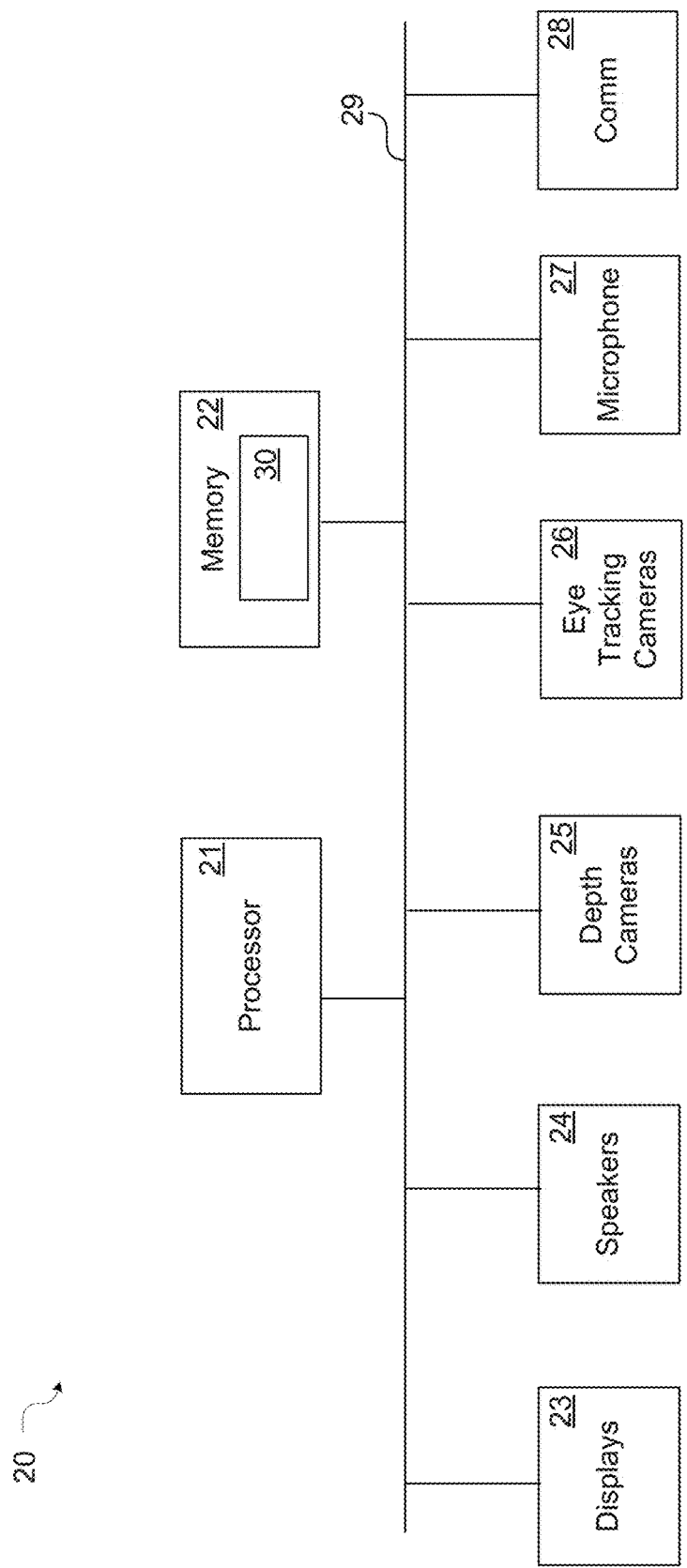
FIG. 2 is a high-level block diagram of certain components of an AR/VR headset.

FIG. 2 is a high-level block diagram of certain components of an AR/VR headset 20, according to some embodiments of the technique introduced here. The headset 20 and components in FIG. 2 may be representative of the headset 1 in FIG. 2. In FIG. 2, the functional components of the headset 20 include one or more instance of each of the following: a processor 21, memory 22, transparent or semi-transparent AR/VR display device 23, audio speaker 24, depth camera 25, eye-tracking camera 26, microphone 27, and communication device 28, all coupled together (directly or indirectly) by an interconnect 29. The interconnect 29 may be or include one or more conductive traces, buses, point-to-point connections, controllers, adapters, wireless links and/or other conventional connection devices and/or media, at least some of which may operate independently of each other.

The processor(s) 21 individually and/or collectively control the overall operation of the headset 20 and perform various data processing functions. Additionally, the processor(s) 21 may provide at least some of the computation and data processing functionality for generating and displaying the above-mentioned object placement tool. Each processor 21 can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Data and instructions (code) 30 that configure the processor(s) 31 to execute aspects of the technique introduced here can be stored in the one or more memories 22. Each memory 22 can be or include one or more physical storage devices, which may be in the form of random access memory (RAM), read-only memory (ROM) (which may be erasable and programmable), flash memory, miniature hard disk drive, or other suitable type of storage device, or a combination of such devices.

The one or more communication devices 28 enable the headset 20 to receive data and/or commands from, and send data and/or commands to, a separate, external processing system, such as a personal computer or game console. Each communication device 28 can be or include, for example, a universal serial bus (USB) adapter, Wi-Fi transceiver, Bluetooth or Bluetooth Low Energy (BLE) transceiver, Ethernet adapter, cable modem, DSL modem, cellular transceiver (e.g., 3G, LTE/4G or 5G), baseband processor, or the like, or a combination thereof.

Each depth camera 25 can apply, for example, time-of-flight principles to determine distances to nearby objects. The distance information acquired by the depth camera 25 is used (e.g., by processor(s) 21) to construct a 3D mesh model of the surfaces in the user's environment. Each eye tracking camera 26 can be, for example, a near-infrared camera that detects gaze direction based on specular reflection, from the pupil and/or corneal glints, of near infrared light emitted by one or more near-IR sources on the headset, such as illumination source 7 in FIG. 1. To enable detection of such reflections, the internal surface of the lenses of the headset (e.g., lenses 3 in FIG. 1) may be coated with a substance that is reflective to IR light but transparent to visible light; such substances are known in the art. This approach allows illumination from the IR source to bounce off the inner surface of the lens to the user's eye, where it is reflected back to the eye tracking camera (possibly via the inner surface of the lens again).

Note that any or all of the above-mentioned components may be fully self-contained in terms of their above-described functionally; however, in some embodiments, one or more processors 21 provide at least some of the processing functionality associated with the other components. For example, at least some of the data processing for depth detection associated with depth cameras 25 may be performed by processor(s) 21. Similarly, at least some of the data processing for gaze tracking associated with gaze tracking cameras 26 may be performed by processor(s) 21. Likewise, at least some of the image processing that supports AR/VR displays 23 may be performed by processor(s) 21; and so forth.

IV. Example of Tool Operation

Figure 3A:
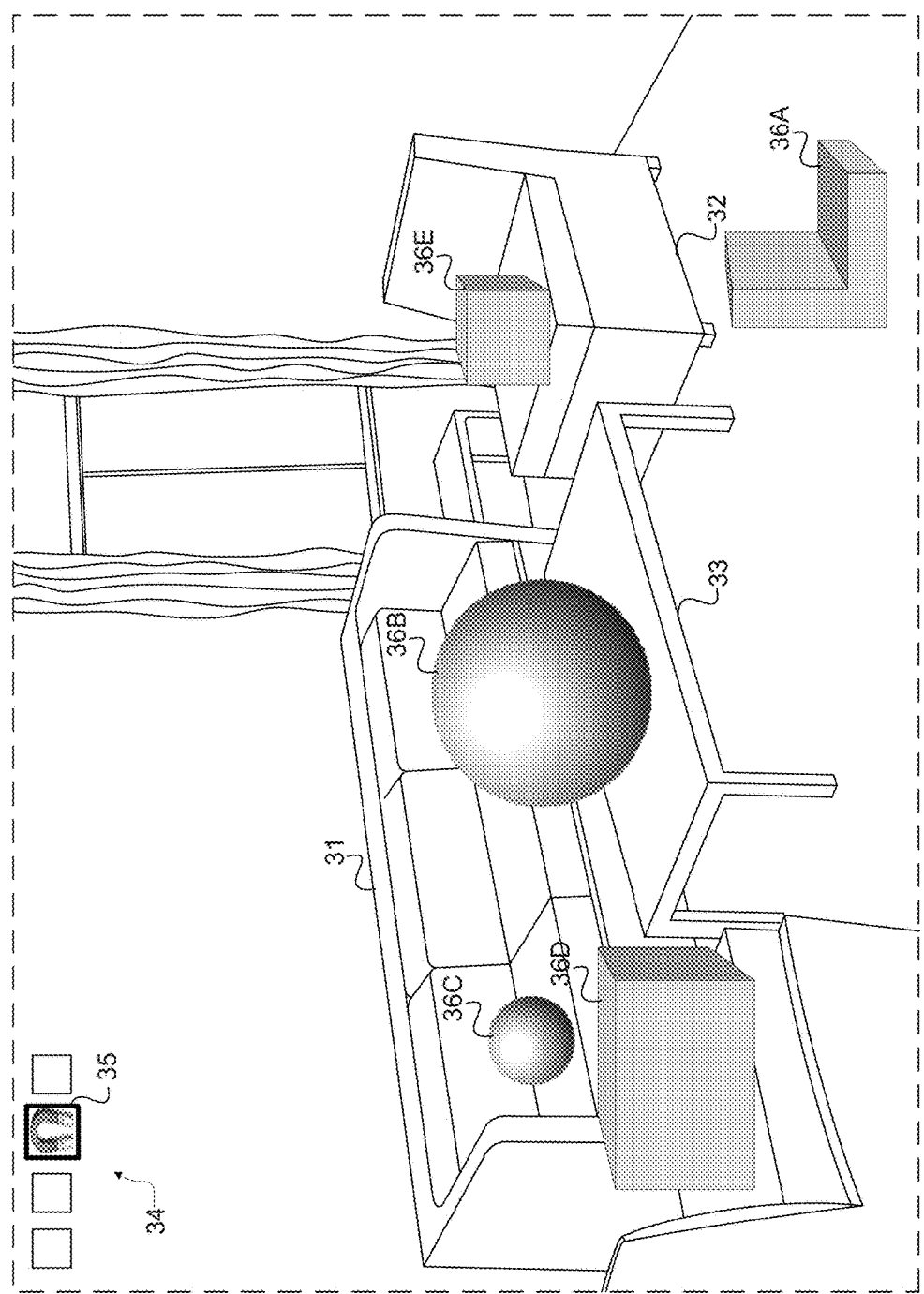

An example of how an AR/VR headset can provide the object placement tool will now be described with reference to FIGS. 3A through 3K. FIGS. 3A through 3K show various examples of a user's view through an AR/VR headset (e.g., through lenses 3 and display devices 4 in FIG. 1). In particular, FIG. 3A shows the central portion of a view that a user of the headset might have while standing in a room in a home while wearing the headset (peripheral vision is truncated in the figure due to page size limitations). Through the display area of the headset, the user may see various real-world objects, such as a sofa 31 and chairs 32, positioned around a coffee table 33. The headset may also display various holographic objects, such as objects 36A, 36B, 36C, 36D and 36E, overlaid on the real-world view. The headset may also display one or more holographic icons 35 or other user interface elements in the user's field of view, to enable the user to use various functions of the headset. For example, one of the user interface elements may be an icon 34 (or other equivalent element) for selecting/initiating operation of the magnet tool.

While the headset is operational, it uses its depth camera(s) to construct a 3D mesh model of all surfaces in the user's vicinity (e.g., within several meters), or at least of all nearby surfaces within the user's field of view, including their distances from the user (i.e., from the headset). Techniques for generating a 3D mesh model of nearby surfaces by using depth detection (e.g., time of flight) are known in the art and need not be described herein. Accordingly, the 3D mesh model in the example of FIG. 3A would model at least all visible surfaces of the sofa 31, chairs 32 and coffee table 33, as well as the room's walls, floor and ceiling, windows, and potentially even smaller features such as curtains, artwork (not shown) mounted on the walls, etc. The 3D mesh model can be stored in memory on the headset. By use of the 3D mesh model and image data from the visual tracking system (e.g., cameras 10), circuitry in the headset (e.g., processor(s) 21) can at any time determine the user's precise position within the room. The 3D mesh model can be automatically updated on a frequent basis, such as several times per second.

By using the headset, and through the use of hand gestures, voice commands and/or controlled gaze, the user can create and manipulate various 3D holographic (AR) objects, such as objects 36A, 36B, 36C, 36D and 36E. As shown, these objects are overlaid on the user's view of the real world. In an actual implementation, the user may be able to create and manipulate holographic objects that are significantly more complex than those shown.

Figure 3B:
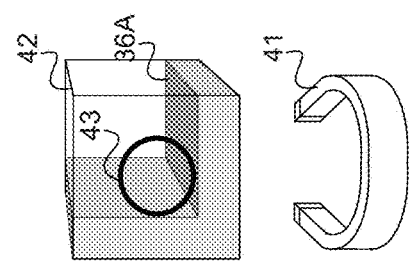

Assume now that the user of the headset wants to move object 36A and stick it to the surface of object 36B. Accordingly, the user can activate the magnet tool to do so. The user may, for example, use a hand gesture to point to and tap on the magnet icon 35, or may simply speak a command, such as "magnet." As shown in FIG. 3B, in some embodiments the headset 1 may then display a holographic magnet image 41 that appears to float in the user's field of view, centrally in the lower part of the user's field of view, and pointed in the direction of the user's gaze.

Figure 3C:
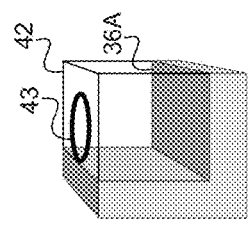

The user then selects an object to pick up with the magnet, which in this example is object 36A. As noted above, in some embodiments the headset includes eye-tracking sensors and circuitry to continuously determine the gaze vector of the user (in other embodiments the headset may use a different technique to determine the user's gaze vector, such as a head-tracking technique that determines the point in 3D space between the user's two eyes and the current "forward" direction the user is facing in the world). When the user's gaze is directed at a holographic object, such as object 36A (as determined by raycasting from the user's viewpoint, for example), that object becomes highlighted with a transparent bounding volume, such as bounding box 42 shown in FIG. 3B. (Note that to simplify illustration, objects other than object 36A and object 36B are not shown in FIGS. 3B through 3J.) Additionally, a cursor (which in this example is a circle) 43 appears on whichever surface of the bounding box 42 is currently hit by the ray cast from the user's viewpoint. The bounding box 42 and cursor 43 together help the user visualize how the object 36A will be oriented if and when it is picked up with the magnet tool. As shown in FIG. 3C, if the user's gaze vector changes so that the raycast hits a different surface of the bounding box 42, the location and appearance of the cursor 43 will change accordingly to appear on that surface. FIG. 3C, for example, shows the appearance of the cursor 43 when the user's gaze vector hits the top surface of the bounding box 42. The magnet image 41 may still be displayed at this point and throughout the rest of the process of using the magnet tool; however, to simplify illustration it is not shown in FIGS. 3C through 3K.

Assume now that the user inputs a command to pick up object 36A while targeting the top surface of the bounding box 42, as shown in FIG. 3C. The user may do this by, for example, making a predetermined hand gesture or by speaking a predetermined command, such as "Pick up." When that input is detected by the headset, the object (which becomes the "source object" or "held object") is immediately reoriented so that the targeted face of the bounding box 42 and cursor 43 are now facing the user, as shown in FIG. 3D. In an embodiment where a holographic magnet image 41 (see FIG. 3B) is displayed, the targeted face of the bounding box 42 may be shown stuck to the magnet image at this point in the process. The source object 36A, cursor 43 and (if displayed) magnet image 41 may be positioned slightly below the user's point of view to keep them from obscuring potential target objects. The source object 36A and magnet image 41 are kept aligned with the user's gaze vector (at least along a horizontal axis) as the user's gaze changes, thereby giving the user the impression that the source object is being held and carried by the user with his gaze.

Once the source object has been picked up, the user then proceeds to identify the target object. The target object can be determined by ray casting, for example, by casting a ray 45 from the location of the cursor 43 outward in the direction of the user's gaze, as shown in FIG. 3E (note, however, that ray 45 is not necessarily visible to the user). In some embodiments, any object hit by a ray cast from the cursor 43 and meeting certain criteria is selected as the current target object. Objects in the scene not currently targeted can be made at least partially transparent, so that the target object is more clear, while retaining some visual indication of the locations of the surrounding objects. A depth "pre-pass" may be included in the rendering process to display only the front surface of transparent or partially transparent objects.

Figure 3G:
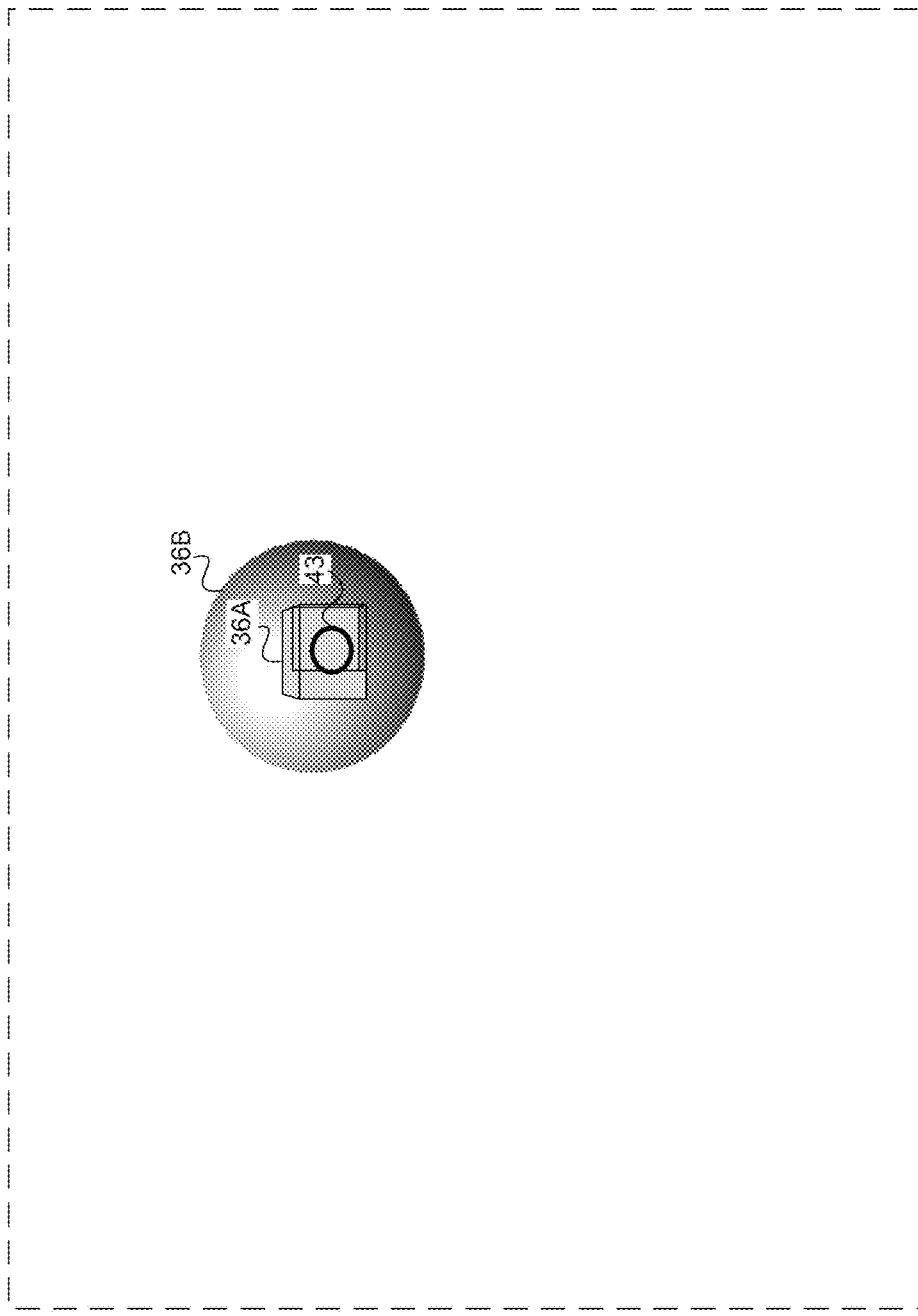

As mentioned above, the present example assumes that the user wishes to stick (source) object 36A onto object 36B. Accordingly, after picking up the source object 36A, the user looks at object 36B to target it (i.e., to cause the ray cast to intersect object 36B), as shown in FIG. 3F. When the ray cast from the cursor intersects or comes within a predetermined distance/angle of a potential target object that satisfies the selection criteria, such as object 36B, the source object will appear to snap to the nearest surface of that object, as shown in FIG. 3G, making that object the current target object. In some embodiments, this snap operation will occur if the ray cast from the cursor comes within a certain threshold distance or angle of a potential target object, even if the ray does not directly hit the potential target object. For purposes of this operation, all objects are treated as opaque to raycasts, i.e., a cast ray will stop at the first object it hits.

Figure 3H:
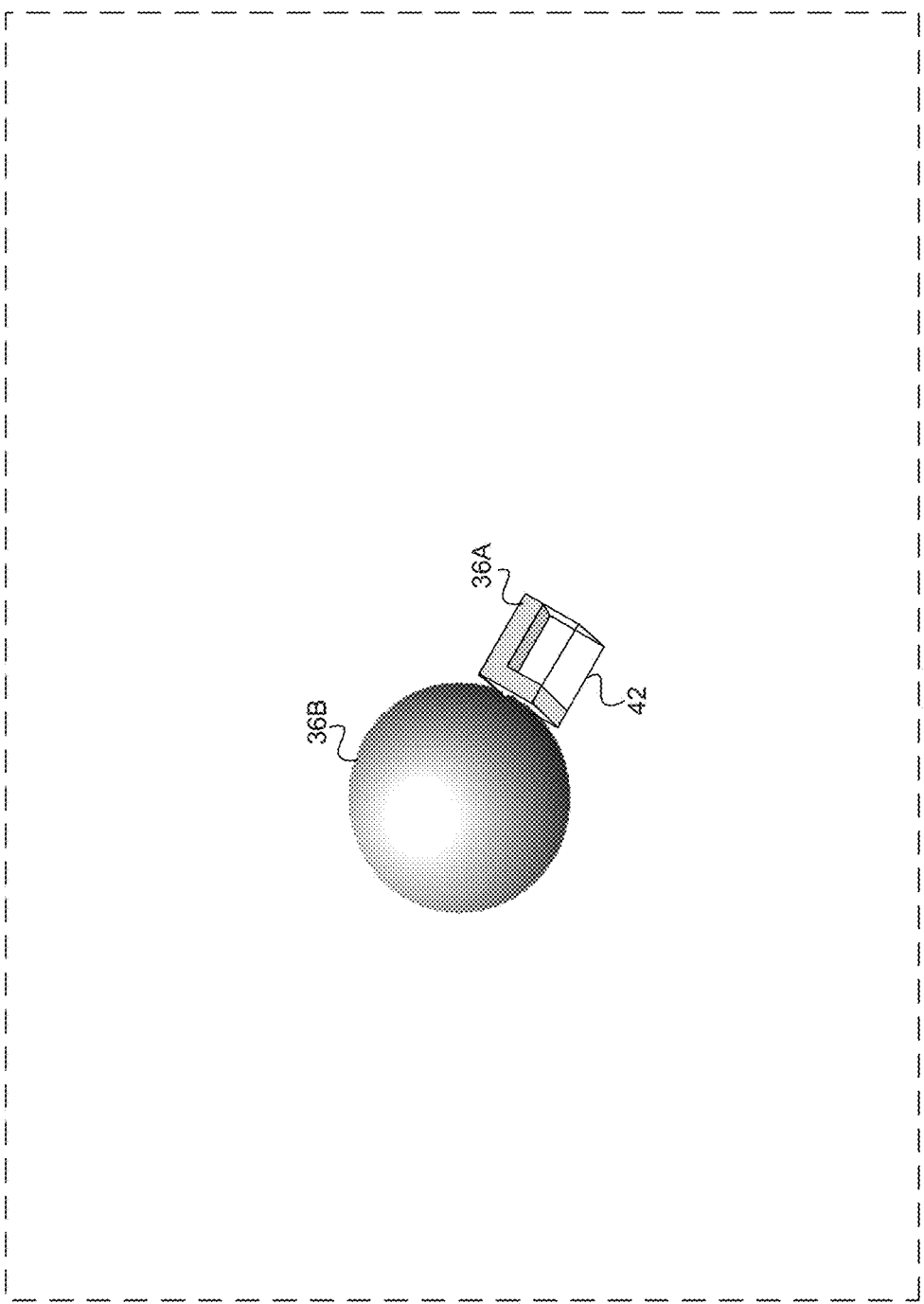
Figure 3I:
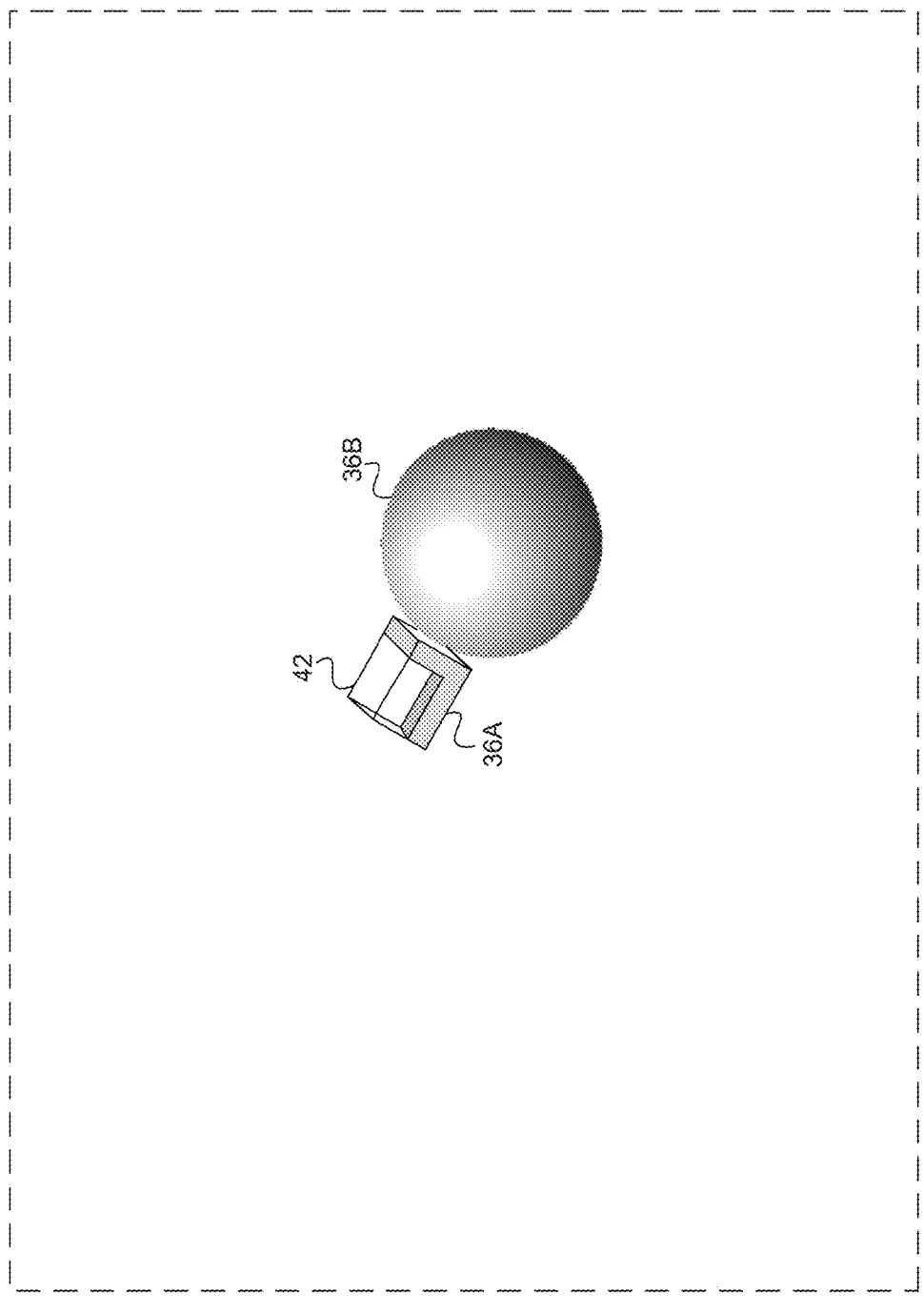

The preferred placement point for the source object on the target object may be determined by a sphere casting operation, as described above. The user can move the object around on the surface (or surfaces) of the current target object simply by moving his gaze to different points on the target object, or even slightly off the target object. This will cause the source object to appear to slide across the surface or surfaces of the target object. For example, as shown in FIG. 3H, the user can cause the source object 36A to move down and to the right along the surface of target object 36B by shifting his gaze downward and to the right. Similarly, as shown in FIG. 3I, the user can cause the source object 36A to move up and to the left along the surface of target object 36B by shifting his gaze upward and to the left. If the user directs his gaze off the target object by more than some threshold distance (or angle) and/or for more than a threshold amount of time, the target object may cease to be designated as targeted.

Figure 3J:
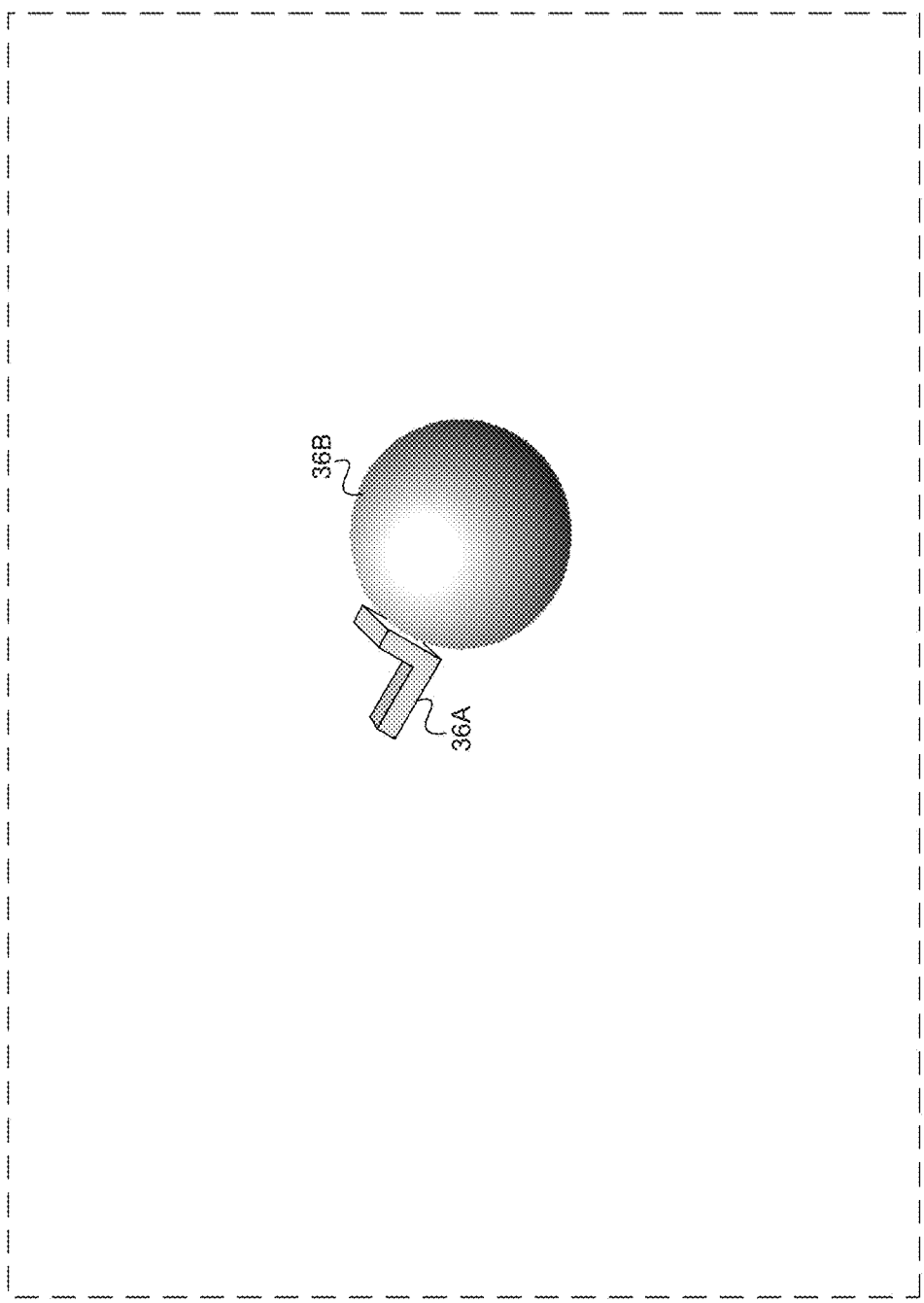
Figure 3K:
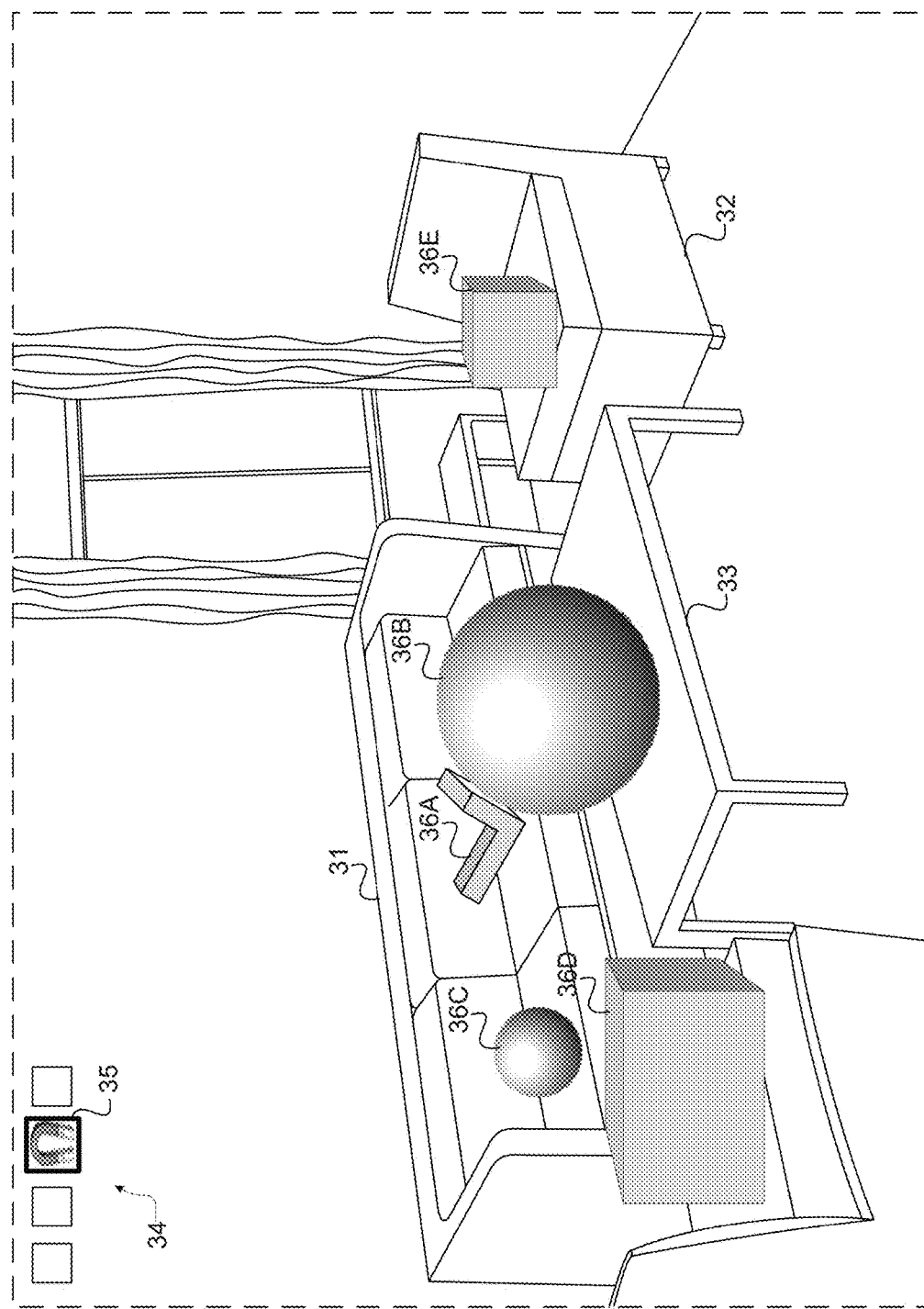

Assume now that the user wishes to attach object 36A to object 36B in the relative positions shown in FIG. 3I. Accordingly, when the objects are positioned as shown, the user can enter an appropriate input, such as making another tap gesture with the hand or by speaking a command such as "Release." In that event, the source object 36A becomes glued to the target object 36B at its current location and orientation, and the bounding box around source object 36A disappears, as shown in FIG. 3J. Additionally, the other objects in the scene, which may have been made at least partially transparent during target object selection and placement, are returned to their normal levels of opaqueness (typically fully opaque), the target object 36B is moved back to the standard physics layer, and the magnet tool state is reset (e.g., the tool becomes deactivated). Therefore, in the present example, after releasing the source object 36A on the target object 36B, the scene may appear to the user as shown in FIG. 3K.

V. Example Process Flows

Figure 4:
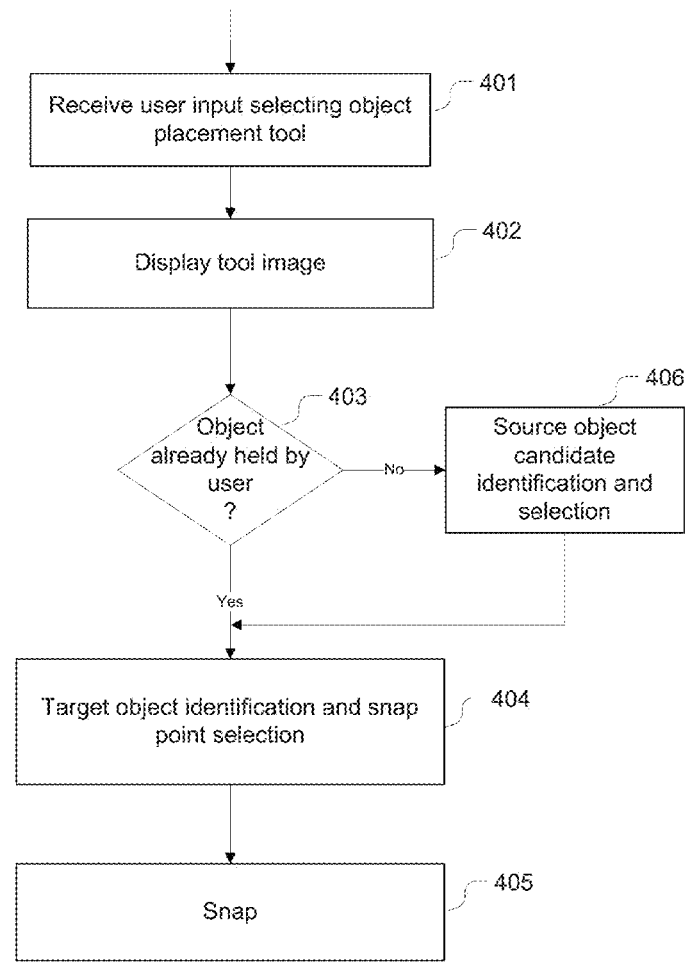
FIG. 4 shows an example of an overall process that may be performed by a visualization device to provide the object placement tool.

Operation of the object placement tool is now further described with reference to the illustrative processes of FIGS. 4 through 6. FIG. 4 shows an example of an overall process that may be performed by a visualization device, such as the AR/VR headset 1, to provide the object placement tool. Initially, at step 401 the process receives user input selecting the placement tool. The input may be, for example, a gesture or a spoken command, or some combination thereof. In response, at step 402 the process displays an image of the placement tool, such as an image of a magnet as described above. Note that step 402 and certain other steps described herein can be omitted in some embodiments. The process then determines at step 403 whether an object is already being held by the user. If no object is currently being held by the user, then the process branches to a source object candidate identification and selection process 406, after which the process proceeds to a target object identification and snap point selection process 404. If no object is already being held by the user at step 403, then the process proceeds directly from step 403 to the target object identification and snap point selection process 404. Following process 404, the snap process 405 is performed, as described further below.

Figure 5:
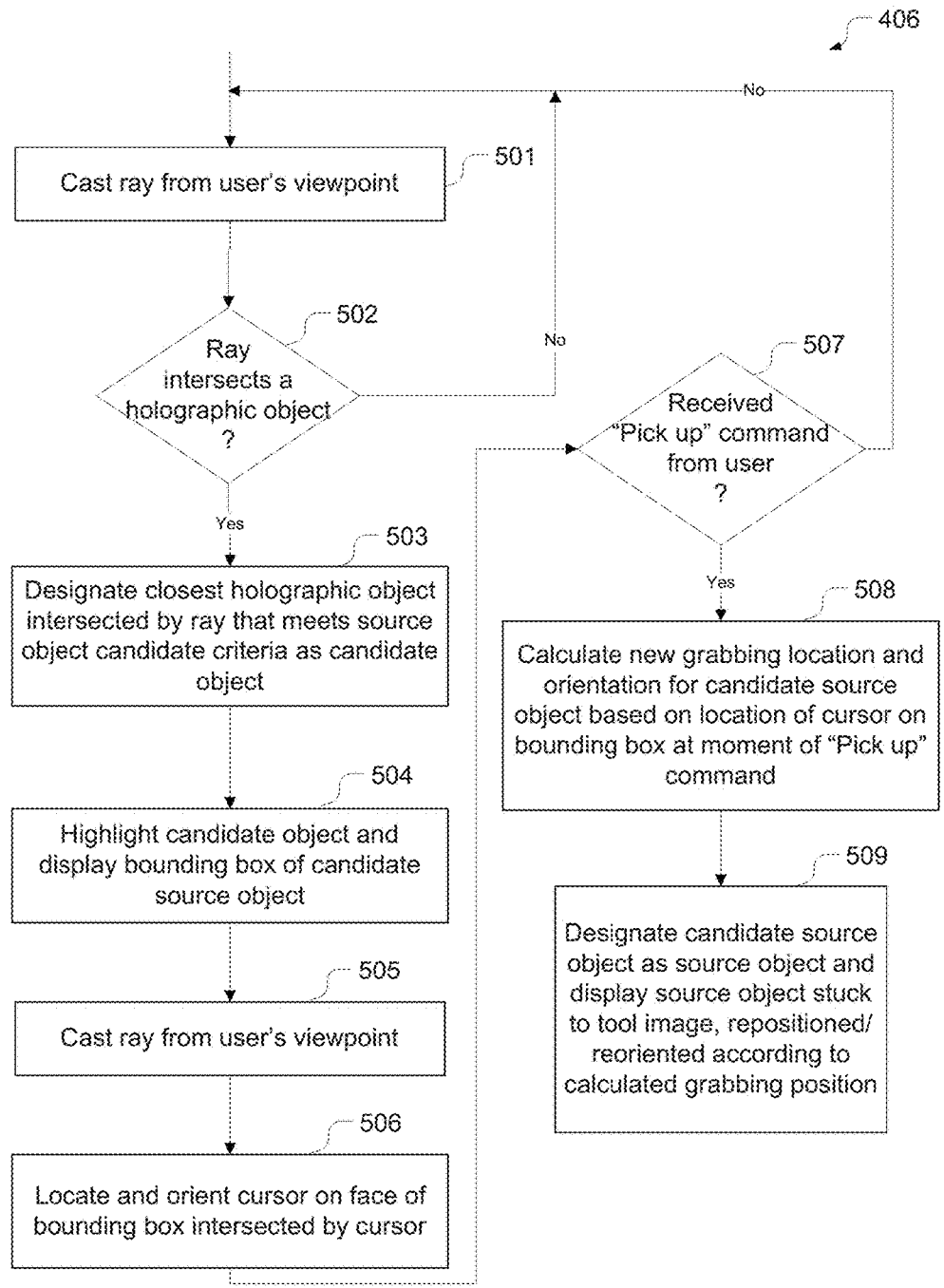
FIG. 5 illustrates an example of a source object candidate identification and selection process.

FIG. 5 illustrates an example of the source object candidate identification and selection process 406. Initially, the process casts a ray outward from the user's viewpoint along the user's gaze vector at step 501. Next, at step 502 the process determines whether the ray intersects a holographic object. If the ray does not intersect any holographic object, the process loops back to step 501 and repeats from there.

The process may use any of various criteria to determine what types of objects are source object candidates (i.e., that can be picked up and stuck to another object), such as the size and/or shape of the object (e.g., relatively large objects may be excluded), the apparent distance of the object from the user (e.g., objects farther than some threshold distance may be excluded), etc., or some combination thereof. Accordingly, if the ray intersects a holographic object at step 502, then the process proceeds to step 503, in which the process designates the closest holographic object intersected by the ray, that meets the source object candidate criteria, as a candidate source object. The process then highlights the candidate source object and displays a bounding box (or other type of bounding volume) around it at step 504. Next, at step 505 the process casts a ray from the user's viewpoint outward along the user's gaze vector. The process then locates and orients the cursor on the face of the bounding box that is intersected by the cursor at step 506. Next, the process checks at step 507 to determine whether a "Pick up" command (or the equivalent) has been received from the user. If no such command has been received, the process loops back to step 501 and repeats from there. If a "Pick up" command (or the equivalent) has been received, then the process proceeds to step 508, in which the process calculates a new "grabbing" location and orientation for the candidate source object, based on the location of the cursor on bounding box at the moment the command was received. The process then designates the candidate source object as the source object, repositions and reorients it according to calculated grabbing location (as shown for example in FIG. 3D), and optionally displays the source object as stuck to an image of the tool.

Figure 6:
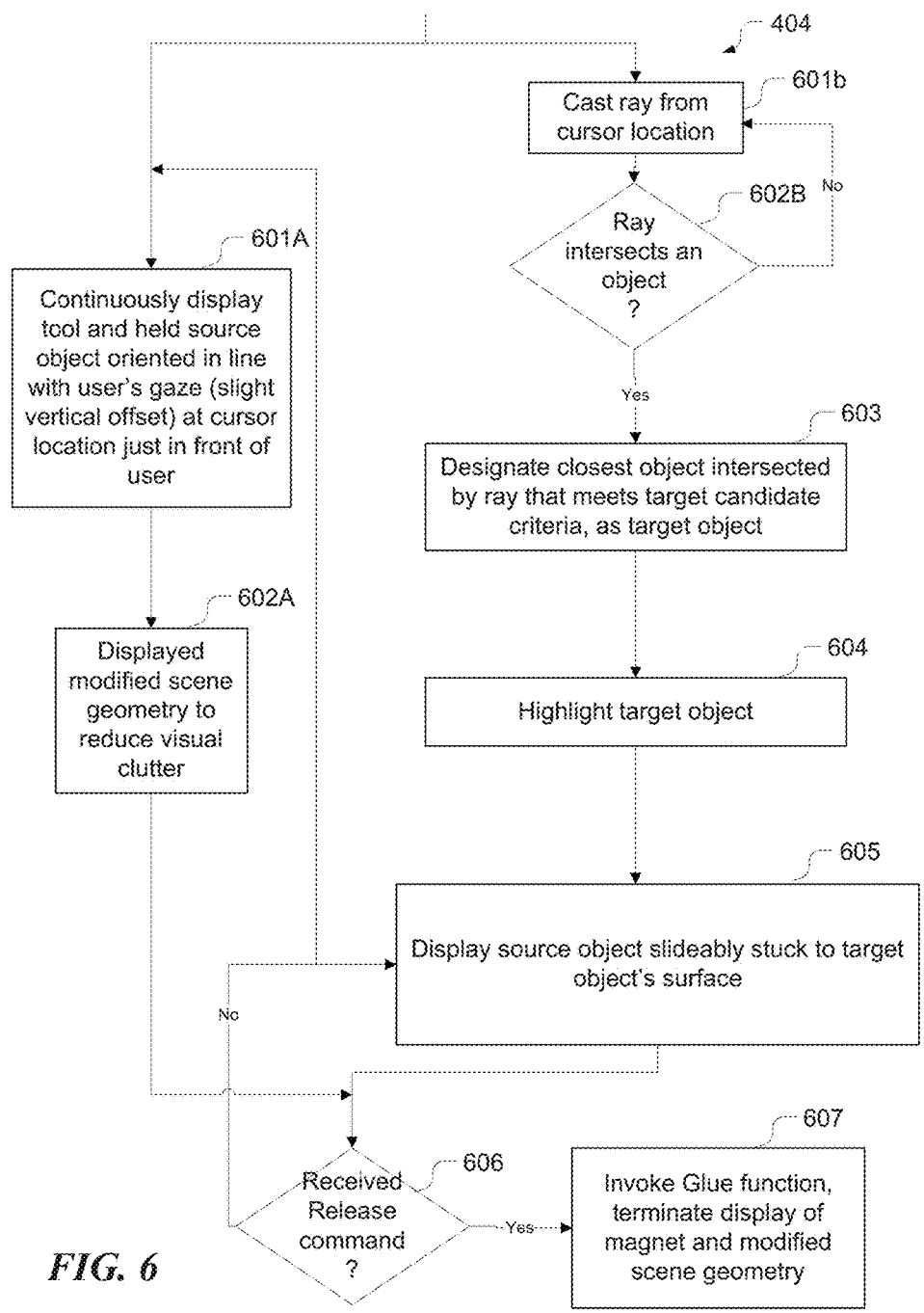
FIG. 6 illustrates an example of a target object identification and snap point selection process.

FIG. 6 illustrates an example of the target object identification and snap point selection process 404. In the illustrated embodiment, there are two subprocesses that are essentially concurrent (i.e., the figure is not meant to indicate precise timing relationships). The first subprocess includes steps 601A and 602A, while the second subprocess includes steps 601B, 602B and 603 through 605. At step 601A, the first subprocess continuously displays the tool image (e.g., magnet image) and the source object oriented in line with the user's gaze (with a slight downward vertical offset) at the cursor location, just in front of the user (e.g., at an apparent distance of about 1 m in front of the user). Next, at step 602A the first subprocess displays modified scene geometry to reduce visual clutter, for example, by making all objects other than the source object and target object transparent.

At step 601B the second subprocess casts a ray from the cursor location outward along the user's gaze vector. The ray is cast continuously at least until a target object is selected. The second subprocess then determines at step 602B whether the ray intersects any holographic object. If the ray does not intersect any holographic object, then the second subprocess loops back to step 601B and repeats from there.

Process 404 may use any of various criteria to determine which objects can be target objects of the tool's functionality (i.e., that can have other objects stuck to them), such as: the degree of similarity in size between the object and the source object; the degree of similarity in overall shape between the object and the source object; or the degree of similarity in shape between a particular surface of the object and a particular surface of the source object; etc., or some combination of these criteria. Additionally, these same types of criteria can be used to select the current target object from among two or more candidate target objects.

Accordingly, in the example process of FIG. 6, if the ray intersects an object at step 602B, then the second subprocess proceeds to step 603, in which it designates the closest object intersected by the ray, that meets target object candidate criteria, as the target object. Next, at step 604 the second subprocess highlights the target object.

Surface reconstruction (SR) may be handled as a special case for purposes of selecting a target object. SR refers to the use of meshes to represent real-world surfaces in an AR/VR display environment. Although the SR of the whole display environment can be made up of multiple meshes, the meshes can be continuous where they overlap (similar normals/points). Therefore, overlapping meshes can be treated as a single mesh. If the SR mesh is targeted by operation of the placement tool operation, it can be made visible to the user in a local area around the cursor, i.e. not the whole mesh, to avoid visual clutter.

After highlighting the target object, the second subprocess at step 605 displays the source object slideably stuck to the target object's surface, generally at the location where the ray cast from the cursor intersects the target object. The precise location at which the source object is located on the target object at any given moment (i.e., the "snap point") can be determined by use of sphere casting, as described above.

In general, the surface of the source object that is closest to the target object (excluding the surface on which the cursor is located) is made to stick to the snap target location on the surface of the target object. If both of those surfaces are flat, then the surfaces can be simply stuck together and become coplanar. If one or both of the surfaces are curved, however, then they can be stuck to each other so that their normal vectors at the point(s) of contact are co-linear.

Following step 602A and step 605, the two concurrent subprocesses merge at step 606, in which the process 404 determines whether a Release command has been received from the user. The Release command can be in the form of, for example, a tap gesture with the hand or a spoken command. If no such command has been received at step 606, the process loops back to step 605 and repeats from there. If a Release command has been received, then at step 607 the process invokes the Glue function, causing the source object to become stuck to the target object (which can be undone if the user indicates such intent through appropriate input), terminates the display of the tool image, and terminates any scene geometry modifications that may have been provided to reduce visual clutter (e.g., the rendering of surrounding objects as transparent).

V. Refinements

Various techniques can be applied to refine the technique introduced above. Some of these techniques are as follows:

Snapping on object centers—This technique can be enabled once two object faces have snapped together. When the source object's projected center gets close to the projected center of a potential target object, the source object jumps to match. This allows the user to quickly create aligned clusters of objects.

Snapping with custom pivot/root point—An object can have a custom pivot or root position specified that controls the point from which it snaps against other objects. For example, consider a dinosaur hologram that always needs to stay upright. By positioning a custom pivot/root point under the foot of the dinosaur, the underside of the foot would always be used to snap against other objects, ensuring that the dinosaur hologram always stayed upright. Assignment of a custom pivot point may be done by the content author, or even by the user by using a "pinning" tool, for example.

Snapping with custom snap targets—When being automatically snapped against, a target object can include one or more predetermined snap targets. For example, a dinosaur hologram might have a predetermined snap target position and rotation stored in its mouth to make it easy for the user to snap food objects against the dinosaur's mouth.

Snapping of grouped objects—When objects are grouped ("glued") together, the center of mass can change. When snapping to another object, the object center can adjust to use the group's center of mass. Conversely, when being snapped against, individual object-to-object tests can use the group's center, their own center, or preferably both. Supporting both enables a user to easily align a source object against the center of a target object group or a specific target object within a group of objects.

Snapping against world grid—Object positions or edges can be snapped to a fixed-sized grid in the world. The grid may be visible (e.g., in wireframe) or invisible. In the invisible case, the user can be aware of the grid because a carried object would jump between snap points in the grid. Fixed grid sizes are limiting to users because they do not give fine control over placement. Some extensions to the grid technique, therefore, include: 1) an adaptive grid size based on carried object size, 2) varying the grid size based on nearby objects in the world; 3) a partially visible grid that only reveals wireframe near to the carried object (avoid visual clutter); and 4) the grid is enabled to assist initial rough placement and is automatically disabled when the source object gets close to another object (for more precise object-to-object alignment).

Gravity Wells—This technique essentially creates points in the "world" whenever the user's view stabilizes on something. As the user's view stabilizes, the point on the first object the user is looking at becomes sticky, such that whenever the user's view cursor passes through it again, the cursor will slow down, to make object placement easier.

Head Stabilization—This is a variation of the above-mentioned gravity well technique that is based on the user's head rotation (e.g., as measured by tracking cameras, gyroscopes, or the like). It produces a similar effect of stabilizing a head direction-based cursor whenever the user's head rotation significantly slows down.

Requiring stability over time before taking action—This technique requires users to show evidence of a particular decision over time before locking in that decision. For example, it may prevent a user staring at the center of two objects from seeing visuals rapidly switch between the two objects. This can be done by requiring the user to sustain focus on an object for at least predetermined period of time (e.g., half a second) before allowing the new object to be highlighted, targeted or otherwise receive focus.

Requiring user to "escape gravity" after snapping—Once a user has snapped two objects together, the visualization system can make it slightly more difficult for them to escape the snap. This can be done by angular test, for example (e.g., whether the user has looked away more than 5 degrees from his gaze vector) or by evaluating the user's view projected into the surface of the object against an invisible ring.

Predicting user intent based on past snapping behavior—For example, a user who repeatedly snaps and then immediately tries to escape gravity is probably trying to avoid snapping behavior. When such behavior is observed by the system, the system can temporarily lower the snapping radius or disable the mechanism.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, means: a) special-purpose hardwired circuitry, such as one or more application-specific integrated circuits (ASICs), programmable logic devices (PLDs), field programmable gate arrays (FPGAs), or other similar device(s); b) programmable circuitry programmed with software and/or firmware, such as one or more programmed general-purpose microprocessors, digital signal processors (DSPs) and/or microcontrollers, system-on-a-chip systems (SOCs), or other similar device(s); or c) a combination of the forms mentioned in a) and b).

VI. Examples of Certain Embodiments

Certain embodiments of the technology introduced herein are summarized in the following numbered examples:

1. A method of operating a visualization device, the method comprising: displaying, on a display area of the visualization device to a user of the visualization device, a plurality of virtual three-dimensional (3D) objects overlaid on a real-world view of a 3D physical space; executing a holding function that includes displaying a first object of the plurality of virtual 3D objects on the display area so that the first object appears to move through said 3D physical space in response to first input from the user; and identifying a second object of the plurality of virtual 3D objects as a target object for a snap function based on a detected gaze of the user, the snap function being an operation that causes the first object to move to a location on a surface of the target object.

2. A method as recited in example 1, wherein the first input comprises a change in gaze direction of the user.

3. A method as recited in example 1 or example 2, wherein identifying the target object is further based on at least one of: a similarity in size between the first object and a candidate target object; a similarity in overall shape between the first object and a candidate target object; or a similarity in shape between a surface of the first object and a surface of a candidate target object.

4. A method as recited in any of examples 1 to 3, further comprising: detecting that the user wants to trigger the snap operation, based on at least one of: a gesture of the user, a gaze of the user or an utterance of the user; and executing the snap operation by displaying the first object, on the display area of the visualization device, so that the first object appears to move to a target location on the surface of the target object.

5. A method as recited in any of examples 1 to 4, further comprising: determining a target location on the target object, for the snap function, by performing a sphere casting operation.

6. A method as recited in any of examples 1 to 5, further comprising: in response to identifying the target object, causing the first object to appear to slide along a surface of the target object in response to a change in gaze direction of the user.

7. A method as recited in any of examples 1 to 6, further comprising: causing the first object to appear to slide across a plurality of adjacent, non-parallel surfaces of the target object in response to the change in gaze direction of the user.

8. A method as recited in any of examples 1 to 7, further comprising, prior to executing the holding function: identifying the first object as a candidate object for the holding function, based on a gaze of the user; and displaying to the user an indication that the first object has been identified as the candidate object for the holding operation.

9. A method as recited in any of examples 1 to 8, further comprising: displaying to the user a bounding volume of the first object, the bounding volume enclosing the first object and having a plurality of transparent or semi-transparent planar surfaces; displaying to the user a cursor on a surface of the bounding volume, at a location based on a gaze direction of the user, the location of the cursor representing a potential pick-up point for the holding function; causing the cursor to appear to the user to move across two or more of the surfaces of the bounding volume, in response to a change in the gaze direction of the user; and in response to user input for triggering the holding function, initiating the holding function and reorienting the first object according to a current position of the cursor on the bounding volume.

10. A visualization device comprising: a display device having a display area; an eye-tracking subsystem to track a gaze direction of the user; and processor circuitry operatively coupled to the display device and the eye-tracking subsystem, and configured to cause the visualization to device to: cause the display area to display to the user an augmented reality environment that includes a plurality of virtual three-dimensional (3D) objects with a real-world view of a 3D physical space; receive inputs indicative of a gaze direction of the user from the eye-tracking subsystem; and determine, based on the gaze direction of the user, a desire by the user to select one of the virtual 3D objects as a target object for a snap function, the snap function being an operation that causes a held object to move to a location on a surface of the target object.

11. A visualization device as recited in example 10, wherein determining the desire by the user to target said one of the virtual 3D objects for a snap function is further based on at least one of: a similarity in size between the held object and a candidate target object; a similarity in overall shape between the held object and a candidate target object; or a similarity in shape between a surface of the held object and a surface of a candidate target object.

12. A visualization device as recited in example 10 or example 11, wherein the processor circuitry is further configured to execute a holding function that includes displaying the held object so that the held object appears to the user to be carried through said 3D physical space in response to first input from the user.

13. A visualization device as recited in any of examples 10 to 12, wherein the first input comprises a change in gaze direction of the user.

14. A visualization device as recited in any of examples 10 to 13, wherein the processor circuitry is further configured to detect that the user wants to trigger the snap operation, based on at least one of: a gesture of the user, a gaze of the user or an utterance of the user.

15. A visualization device as recited in any of examples 10 to 14, wherein the processor circuitry is further configured to determine a target location on the target object, for the snap function, by performing a sphere casting operation.

16. A visualization device as recited in any of examples 10 to 15, wherein the processor circuitry is further configured to, in response to identifying the target object, cause the held object to appear to slide along a surface of the target object in response to a change in gaze direction of the user.

17. A visualization device as recited in any of examples 10 to 16, wherein the processor circuitry is further configured to, prior to executing the holding function: identify a first object of the plurality of virtual 3D objects as a candidate object for the holding function, based on a gaze of the user; cause the display device to display to the user a bounding volume of the candidate object, the bounding volume having a plurality of transparent or semi-transparent surfaces; cause the display device to display to the user a cursor on a surface of the bounding volume, at a location based on a gaze direction of the user, the location of the cursor representing a potential pick-up point on the candidate object for the holding function; cause the cursor to appear to the user to move across two or more of the surfaces of the bounding volume, in response to a change in the gaze direction of the user; and in response to user input for triggering the holding function, initiate the holding function and reorienting the candidate object according to a current position of the cursor on the bounding volume, such that the candidate object becomes the held object.

18. A head-mountable visualization device comprising: a head fitting by which to mount the visualization device to the head of a user; a display device coupled to the head fitting and having a display area; an eye-tracking subsystem to track a gaze direction of the user; and a processor operatively coupled to the display device and the eye-tracking subsystem, and configured to cause the visualization to device to: cause the display device to superimpose, on the display area, a plurality of virtual three-dimensional (3D) objects on a real-world, real-time view of a 3D physical space; execute a holding function that includes displaying a first object of the plurality of virtual 3D objects on the display area so that the first object appears to the user to be carried through said 3D physical space in response to first input from the user, wherein the first input includes a change in a gaze direction of the user; and a second object of the plurality of virtual 3D objects as a target object for a snap function, based on a detected gaze of the user, the snap function being an operation that causes the first object to move to a location on a surface of the target object.

19. A head-mountable visualization device as recited in example 18, wherein identifying the target object is further based on at least one of: a similarity in size between the first object and a candidate target object; a similarity in overall shape between the first object and a candidate target object; or a similarity in shape between a surface of the first object and a surface of a candidate target object.

20. A head-mountable visualization device as recited in example 18 or example 19, wherein the processor is further configured to, prior to execution of the holding function: identify the first object of the plurality of virtual 3D objects as a candidate object for the holding function, based on a gaze of the user; cause the display device to display to the user a bounding volume of the first object, the bounding volume having a plurality of transparent or semi-transparent surfaces; cause the display device to display to the user a cursor on a surface of the bounding volume, at a location based on a gaze direction of the user, the location of the cursor representing a potential pick-up point on the first object for the holding function; cause the cursor to appear to the user to move across two or more of the surfaces of the bounding volume, in response to a change in the gaze direction of the user; and in response to user input for triggering the holding function, initiate the holding function and reorienting the first object according to a current position of the cursor on the bounding volume.

21. A visualization device comprising: means for displaying, on a display area of the visualization device to a user of the visualization device, a plurality of virtual three-dimensional (3D) objects overlaid on a real-world view of a 3D physical space; means for executing a holding function that includes displaying a first object of the plurality of virtual 3D objects on the display area so that the first object appears to move through said 3D physical space in response to first input from the user; and means for identifying a second object of the plurality of virtual 3D objects as a target object for a snap function based on a detected gaze of the user, the snap function being an operation that causes the first object to move to a location on a surface of the target object.

2. A visualization device as recited in example 1, wherein the first input comprises a change in gaze direction of the user.

3. A visualization device as recited in example 1 or example 2, wherein the identifying the target object is further based on at least one of: a similarity in size between the first object and a candidate target object; a similarity in overall shape between the first object and a candidate target object; or a similarity in shape between a surface of the first object and a surface of a candidate target object.

4. A visualization device as recited in any of examples 1 to 3, further comprising: means for detecting that the user wants to trigger the snap operation, based on at least one of: a gesture of the user, a gaze of the user or an utterance of the user; and executing the snap operation by displaying the first object, on the display area of the visualization device, so that the first object appears to move to a target location on the surface of the target object.

5. A visualization device as recited in any of examples 1 to 4, further comprising: means for determining a target location on the target object, for the snap function, by performing a sphere casting operation.

6. A visualization device as recited in any of examples 1 to 5, further comprising: means for causing, in response to identifying the target object, the first object to appear to slide along a surface of the target object in response to a change in gaze direction of the user.

7. A visualization device as recited in any of examples 1 to 6, further comprising: means for causing the first object to appear to slide across a plurality of adjacent, non-parallel surfaces of the target object in response to the change in gaze direction of the user.

8. A visualization device as recited in any of examples 1 to 7, further comprising: means for identifying, prior to executing the holding function, the first object as a candidate object for the holding function, based on a gaze of the user; and means for displaying to the user an indication that the first object has been identified as the candidate object for the holding operation.

9. A visualization device as recited in any of examples 1 to 8, further comprising: means for displaying to the user a bounding volume of the first object, the bounding volume enclosing the first object and having a plurality of transparent or semi-transparent planar surfaces; means for displaying to the user a cursor on a surface of the bounding volume, at a location based on a gaze direction of the user, the location of the cursor representing a potential pick-up point for the holding function; means for causing the cursor to appear to the user to move across two or more of the surfaces of the bounding volume, in response to a change in the gaze direction of the user; and means for initiating the holding function and reorienting the first object according to a current position of the cursor on the bounding volume, in response to user input for triggering the holding function.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of operating a visualization device, the method comprising:
    displaying, on a display area of the visualization device to a user of the visualization device, a plurality of virtual three-dimensional (3D) objects overlaid on a real-world view of a 3D physical space;
    identifying a first object of the plurality of virtual 3D objects as a candidate object for a holding function, based on a gaze of the user;
    displaying to the user an indication that the first object has been identified as the candidate object for the holding operation;
    displaying to the user a bounding volume of the first object, the bounding volume enclosing the first object and having a plurality of transparent or semi-transparent planar surfaces;
    displaying to the user a cursor on a surface of the bounding volume, at a location based on a gaze direction of the user, the location of the cursor representing a potential pick-up point for the holding function;
    causing the cursor to appear to the user to move across two or more of the surfaces of the bounding volume, in response to a change in the gaze direction of the user;
    in response to user input for triggering the holding function, initiating the holding function and reorienting the first object according to a current position of the cursor on the bounding volume, wherein the holding function includes displaying a first object of the plurality of virtual 3D objects on the display area so that the first object appears to move through said 3D physical space in response to first input from the user; and
    identifying a second object of the plurality of virtual 3D objects as a target object for a snap function based on a detected gaze of the user, the snap function being an operation that causes the first object to move to a location on a surface of the target object.

2. A method as recited in claim 1, wherein the first input comprises a change in gaze direction of the user.

3. A method as recited in claim 1, wherein identifying the target object is further based on at least one of:
    a similarity in size between the first object and a candidate target object;
    a similarity in overall shape between the first object and a candidate target object; or
    a similarity in shape between a surface of the first object and a surface of a candidate target object.

4. A method as recited in claim 1, further comprising:
    detecting that the user wants to trigger the snap operation, based on at least one of: a gesture of the user, a gaze of the user or an utterance of the user; and
    executing the snap operation by displaying the first object, on the display area of the visualization device, so that the first object appears to move to a target location on the surface of the target object.

5. A method as recited in claim 1, further comprising:
    determining a target location on the target object, for the snap function, by performing a sphere casting operation.

6. A method as recited in claim 1, further comprising:
in response to identifying the target object, causing the first object to appear to slide along a surface of the target object in response to a change in gaze direction of the user.

7. A method as recited in claim 1, further comprising:
causing the first object to appear to slide across a plurality of adjacent, non-parallel surfaces of the target object in response to the change in gaze direction of the user.

8. A visualization device comprising:
a display device having a display area;
an eye-tracking subsystem to track a gaze direction of the user; and
processor circuitry operatively coupled to the display device and the eye-tracking subsystem, and configured to cause the visualization to device to:
 cause the display area to display to the user an augmented reality environment that includes a plurality of virtual three-dimensional (3D) objects with a real-world view of a 3D physical space;
 identify a first object of the plurality of virtual 3D objects as a candidate object for a holding function, based on a gaze of the user;
 cause the display device to display to the user a bounding volume of the candidate object, the bounding volume having a plurality of transparent or semi-transparent surfaces;
 cause the display device to display to the user a cursor on a surface of the bounding volume, at a location based on a gaze direction of the user, the location of the cursor representing a potential pick-up point on the candidate object for the holding function;
 cause the cursor to appear to the user to move across two or more of the surfaces of the bounding volume, in response to a change in the gaze direction of the user; and
 in response to user input for triggering the holding function, initiate the holding function and reorienting the candidate object according to a current position of the cursor on the bounding volume, such that the candidate object becomes a held object;
 receive inputs indicative of a gaze direction of the user from the eye-tracking subsystem; and
 determine, based on the gaze direction of the user, a desire by the user to select one of the virtual 3D objects as a target object for a snap function, the snap function being an operation that causes the held object to move to a location on a surface of the target object.

9. A visualization device as recited in claim 8, wherein determining the desire by the user to target said one of the virtual 3D objects for a snap function is further based on at least one of:
a similarity in size between the held object and a candidate target object;
a similarity in overall shape between the held object and a candidate target object; or
a similarity in shape between a surface of the held object and a surface of a candidate target object.

10. A visualization device as recited in claim 8, wherein the holding function includes displaying the held object so that the held object appears to the user to be carried through said 3D physical space in response to first input from the user.

11. A visualization device as recited in claim 10, wherein the first input comprises a change in gaze direction of the user.

12. A visualization device as recited in claim 8, wherein the processor circuitry is further configured to detect that the user wants to trigger the snap operation, based on at least one of: a gesture of the user, a gaze of the user or an utterance of the user.

13. A visualization device as recited in claim 8, wherein the processor circuitry is further configured to determine a target location on the target object, for the snap function, by performing a sphere casting operation.

14. A visualization device as recited in claim 8, wherein the processor circuitry is further configured to, in response to identifying the target object, cause the held object to appear to slide along a surface of the target object in response to a change in gaze direction of the user.

15. A head-mountable visualization device comprising:
a head fitting by which to mount the visualization device to the head of a user;
a display device coupled to the head fitting and having a display area;
an eye-tracking subsystem to track a gaze direction of the user; and
a processor operatively coupled to the display device and the eye-tracking subsystem, and configured to cause the visualization to device to:
 cause the display device to superimpose, on the display area, a plurality of virtual three-dimensional (3D) objects on a real-world, real-time view of a 3D physical space;
 identify a first object of the plurality of virtual 3D objects as a candidate object for a holding function, based on a gaze of the user;
 cause the display device to display to the user a bounding volume of the first object, the bounding volume having a plurality of transparent or semi-transparent surfaces;
 cause the display device to display to the user a cursor on a surface of the bounding volume, at a location based on a gaze direction of the user, the location of the cursor representing a potential pick-up point on the first object for the holding function;
 cause the cursor to appear to the user to move across two or more of the surfaces of the bounding volume, in response to a change in the gaze direction of the user;
 in response to user input for triggering the holding function, initiate the holding function and reorienting the first object according to a current position of the cursor on the bounding volume, wherein the holding function includes displaying the first object on the display area so that the first object appears to the user to be carried through said 3D physical space in response to first input from the user, wherein the first input includes a change in a gaze direction of the user; and
 identify a second object of the plurality of virtual 3D objects as a target object for a snap function, based on a detected gaze of the user, the snap function being an operation that causes the first object to move to a location on a surface of the target object.

16. A head-mountable visualization device as recited in claim 15, wherein identifying the target object is further based on at least one of:
a similarity in size between the first object and a candidate target object;
a similarity in overall shape between the first object and a candidate target object; or
a similarity in shape between a surface of the first object and a surface of a candidate target object.

* * * * *